May 12, 1942.  J. P. BURKE  2,282,851

CLINCH NUT

Filed Nov. 15, 1939

INVENTOR.
James P. Burke
BY
ATTORNEY.

Patented May 12, 1942

2,282,851

UNITED STATES PATENT OFFICE 2,282,851

CLINCH NUT

James P. Burke, Knoxville, Tenn., assignor to Bert L. Quarnstrom and F. L. McLaughlin, both of Detroit, Mich.

Application November 15, 1939, Serial No. 304,498

1 Claim. (Cl. 10—86)

This invention relates to nuts such as are clinched onto sheet metal panels etc. and has for its primary object to provide an inexpensive clinch nut of generally improved characteristics.

The invention is more particularly concerned with nuts formed of sheet metal.

The main object, more specifically stated, is to provide a sheet metal nut, formed from a sheet metal blank by metal presses, and embodying structural features which better suit it for its intended use where a clinch-over portion thereof is inserted into an aperture in a sheet metal member and subsequently clinched over the walls of said aperture to retain it thereon. Nuts of the general type here contemplated are used quite extensively in the automobile industry, in which case body panels etc. are provided with apertures, the nuts have their clinch-over portions inserted therein, and a metal press bends the clinch-over portions into a clinching position.

It is essential, of course, that the nut be so constructed that the clinching operation may be performed thereon without causing distortion or creasing of the body stock. For this reason the nuts were formed comparatively heavy, in fact probably the best example of the nut found most satisfactory is the cage nut, which comprises a standard nut with a sheet metal cage having portions wrapped around the nut and other portions serving as clinch-over means. Such nuts, although strong, are comparatively expensive, and the object of this invention is to provide a less expensive nut which is equally if not more efficient than those heretofore used.

To the attainment of the above stated object the invention provides a sheet metal nut of thin or sheet metal, having a tubular internally threaded projection at one side, a central or body portion formed of double thickness, and a box-like projection at the other side which serves as the clinch-over means. Differently described, the nut may be visualized as a tubular body, internally screwthreaded, and at one end flanged outwardly, with flange bent inwardly upon itself and having a box-like projection in opposed relation to the tubular stem. With this construction each of the elements functions in the support and reinforcement of the other and the nut, although light in weight and inexpensive to handle, embodies an exceptionally high degree of strength.

Other objects and advantages will become more fully apparent as reference is made to the accompanying drawing, wherein my invention is illustrated, and in which.

Figure 1:
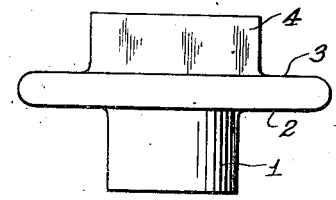
Fig. 1 is a side elevation of the nut.
Figure 2:
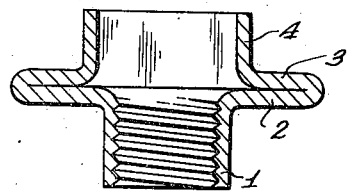
Fig. 2 is a vertical cross section.
Figure 3:
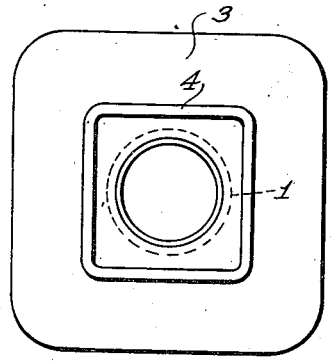
Fig. 3 is a plan, illustrating the nut as square in shape.
Figure 4:
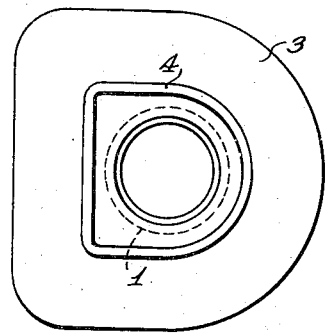
Fig. 4 is a plan, illustrating a nut having an alternative form.
Figure 5:
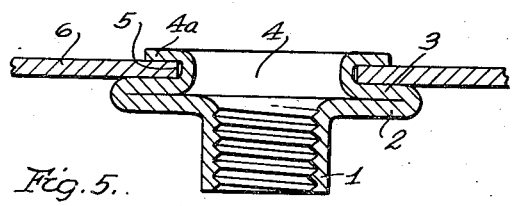
Fig. 5 is a section illustrating the nut secured on a support.

The nut comprises a tubular, internally threaded portion 1 having an outwardly radiating flange 2 integral therewith at one end thereof. The flange 2 is bent upon itself at 3, and integral with the portion 3 is a lengthwise extending hollow portion 4. The portion 4 constitutes a clinch-over portion, and as illustrated in Figs. 3 and 4, may be of square or D shape in order that when inserted in a similarly shaped aperture it holds the nut against rotation.

When the nut is placed in use the portion 4 is inserted in an aperture 5 in a supporting member 6, and is then bent or clinched over the walls of the aperture 5, as indicated at 4a.

Figure 6:
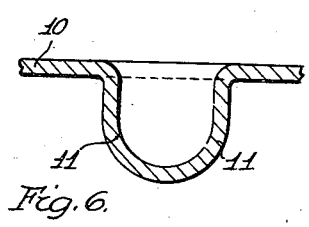
Figs. 6 and 7 are sections illustrating steps in a method of forming the nut.
Figure 7:
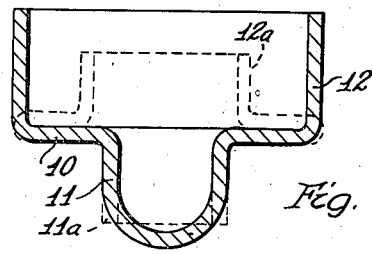

Fig. 6 illustrates the first step in the method of forming the nut, and although this method is preferred because it enables formation of the nut by conventional eyelet machinery, it will be understood, of course, that various other methods might be employed. The first step consists in deforming a sheet metal blank 10 by extruding or forcing a portion thereof outwardly to provide a substantially tubular projection 11. The blank 10 is then bent upwardly at 12 into the form of a square or D. The rectangular projection 12 is then compressed and bent inwardly to the dotted line position shown at 12a, the substantially tubular projection 11 is bent into the form of a tube as indicated at 11a and, finally, the tubular extension 11a is internally threaded by a tapping machine.

Although a specific embodiment of the invention has been illustrated and described, it will be understood that various changes may be made within the scope of the appended claim without departing from the spirit of the invention, and such changes are contemplated.

What is claimed is:

The method of forming a nut which consists in axially extruding the central portion of a sheet metal blank into substantially tubular form to provide a substantially tubular portion having an integral radially extending end flange, in bending a portion of the flange inwardly upon itself to provide a flange portion of double thickness, in bending the remaining portion of the flange into the form of a tube of other than round shape extending axially in opposed aligned relation with said substantially tubular portion, in bending said substantially tubular portion into the form of a tube, and in tapping said last named tube.

JAMES P. BURKE.